(12) United States Patent
Ruan

(10) Patent No.: US 7,389,970 B2
(45) Date of Patent: Jun. 24, 2008

(54) GOODS FASTENING APPARATUS WITH IMPROVED STRUCTURES

(75) Inventor: Boqin Ruan, Zhugang Town (CN)

(73) Assignee: Yuhuan Top Sun Machinery Tool Co., Ltd., Zhugang (CN)

( * ) Notice: Subject to any disclaimer, the term of this patent is extended or adjusted under 35 U.S.C. 154(b) by 0 days.

(21) Appl. No.: 11/452,956

(22) Filed: Jun. 15, 2006

(65) Prior Publication Data

US 2007/0170407 A1   Jul. 26, 2007

(30) Foreign Application Priority Data

Jan. 26, 2006   (CN) .................. 2006 1 0049364

(51) Int. Cl.
    *B66F 1/04*   (2006.01)
(52) U.S. Cl. ..................................... 254/108
(58) Field of Classification Search .............. 254/108, 254/106, 110, 111, 109
    See application file for complete search history.

(56) References Cited

U.S. PATENT DOCUMENTS

| 437,077 A | * | 9/1890 | Alfred | .................. 254/108 |
|---|---|---|---|---|
| 1,946,242 A | * | 2/1934 | Schwerin | .................. 254/108 |
| 3,968,801 A | * | 7/1976 | Simon et al. | ................ 606/124 |
| 5,979,876 A | * | 11/1999 | Cardona | .................. 254/108 |

FOREIGN PATENT DOCUMENTS

| CN | 200310108418.6 | 11/2003 |
|---|---|---|
| CN | 200510060256.2 | 8/2005 |

* cited by examiner

*Primary Examiner*—Lee D Wilson
(74) *Attorney, Agent, or Firm*—Cheng Law Group PLLC

(57) ABSTRACT

A goods fastening apparatus is disclosed which comprises a pipe fixedly connected to a body and a gear rack passing through the body and partly muff-coupled with the inside of the pipe. A hand grip and a positioning claw are hinged to the body through a primary pivot. A driving claw is hinged to the hand grip through a secondary pivot. A plate spring is positioned between the driving claw and the positioning claw. A mobile stopper sheet pressed against the plate spring is provided at the upper portion of the body. A stopper pin is fixed at the hand grip. The stopper pin is positioned at the edge of one side of the positioning claw facing the gear rack while the front end of the positioning claw is embedded into the gear teeth of the gear rack.

11 Claims, 15 Drawing Sheets

GOODS FASTENING APPARATUS WITH IMPROVED STRUCTURES

BACKGROUND OF THE INVENTION

1. Field of Invention

The present invention relates to mechanical technical field, and more particularly, to a goods fastening apparatus for fixing goods in a boxcar or container.

2. Related Art

The goods on automotive vehicles should be fixed during transportation to prevent dislodging. Cords can be directly used to bind the goods for common open cars. However, ordinary cords can not be used for boxcars or containers. Therefore, in order to achieve the goal of fixing goods, it is necessary to employ special fixing device, such as goods fastening apparatus.

The conventional goods fastening apparatus includes a body, a gear rack, a pipe, a driving claw and a positioning claw. The driving claw and the positioning claw can move alternately by pressing and pulling the hand grip, so that the gear rack is brought to move forward, and the gear rack and the pipe are drawn out, finally the gear rack and the pipe are pressed against the sidewalls of the packing box respectively. This way, the goods will not be dislodged during transportation. For purpose of safety, the gear rack should be slowly disengaged to zero load one gear tooth by one gear tooth during unloading after use. In such a case, the operation can not be conducted quickly, thus it is troublesome and waste of time.

In order to address the above problems, the designer of the present invention has applied for a patent CN99252919.0 for a goods fastening apparatus with improved structures which could disengage the gear rack quickly. In the apparatus mentioned in the above patent, a small wrench is hinged to the hand grip, the front end of which is located at the plate spring side. The gear rack could be disengaged quickly with the small wrench after use of the goods fastening apparatus, thus the working efficiency is improved. However, it is discovered that the plate spring is driven by the front end of the small wrench to raise the positions of the driving claw and the positioning claw during use, where the claws do not contact with the gear rack. Therefore, the plate spring will certainly be damaged after long-term use, causing the working life thereof reduced. Furthermore, it is hard to control the small wrench during operation, so it should be pressed firmly during disengagement of the gear rack, causing the whole operation laboursome.

SUMMARY OF THE INVENTION

An object of the present invention is to provide a goods fastening apparatus with improved simple and compact structures that is easy to implement, in which the gear rack could be disengaged quickly after use to effectively improve the working efficiency. With the apparatus of the invention, lots of technical problems existing in prior art are resolved, in which the gear rack could only be disengaged one gear tooth by one gear tooth causing troublesome operation and waste of time.

Another object of the present invention is to provide a goods fastening apparatus with improved structures which is easy to operate and control and saves time and labor. With the apparatus of the invention, some technical problems existing in prior art are resolved, in which the operation of disengaging the gear rack is difficult to conduct and control.

Yet another object of the present invention is to provide a goods fastening apparatus with improved structures which could make the disengaging mechanism directly act on the driving claw and the position claw without any influence to other features, thereby causing long working life. With the apparatus of the invention, many technical problems existing in prior art are resolved, in which other features are tended to be damaged with long-term use, thereby causing the working life shortened.

In order to achieve the above goals, an embodiment of the present invention is described in the following context. The goods fastening apparatus of the present invention includes a body, a pipe fixedly connected to the body and a gear rack passing through the body and partly muff-coupled with the inside of the pipe. A hand grip and a positioning claw are hinged to the body through a primary pivot. A driving claw is hinged to the hand grip through a secondary pivot. A plate spring is positioned between the driving claw and the positioning claw. A mobile stopper sheet pressed against the plate spring is provided at the upper portion of the body. The front ends of the driving claw and the positioning claw can be embedded into the gear teeth of the gear rack with aid of the plate spring. A stopper pin is fixed at the hand grip. The stopper pin is positioned at the edge of one side of the positioning claw facing the gear rack while the front end of the positioning claw is embedded into the gear teeth of the gear rack.

A stopper pin is creatively disposed at the hand grip according to the invention. When the gear rack is brought to move forward by making the driving claw and the positioning claw move alternately through pressing and pulling the hand grip, the hand grip is located in a horizontal position, and the stopper pin dose not contact with the positioning claw. The stopper pin will not be pulled up and contact with the positioning claw unless the hand grip is turned back, so that the gear rack could be disengaged quickly.

For purpose of convenient operation and control, a control device is set at the hand grip and the body in the goods fastening apparatus of the invention, to prevent the front ends of the driving claw and the positioning claw detaching form the gear rack by restricting the turning angle of the hand grip.

In the goods fastening apparatus of the invention, said control device has a full back wrench hinged to the hand grip through a pivot and a stopper fixed to the body. During the turning of the hand grip, the stopper could contact with the full back wrench, and the turning angle of the hand grip is restricted by the position of the full back wrench relative to the stopper.

In particular, in the goods fastening apparatus with improved structures above mentioned, a stopper mouth is set on the stopper, and the lower end of the full back wrench could sit against the stopper mouth. When the lower end of the full back wrench is seated against the stopper mouth, the hand grip is located in a horizontal position. Due to the stopper mouth, the hand grip can not keep on turning back.

According to another embodiment of the present invention, in the goods fastening apparatus with improved structures described above, the lower end face of the full back wrench could sit against the upper end face of the stopper. Because the two end faces are pressed against each other, the hand grip can not keep on turning, thereby the back-turn angle can be controlled.

In the goods fastening apparatus of the invention, a torsion spring is provided on the pivot, the two ends of which act on the hand grip and full back wrench respectively.

In the goods fastening apparatus of the invention, a bar-shaped hole is positioned at the hand grip. The lower end of the full back wrench extends out of the bar-shaped hole. The full back wrench contacts with one end of the bar-shaped hole by action of the torsion spring. In such a case, the lower end of the full back wrench is pressed against a position corresponding to the stopper mouth of said stopper. Otherwise, the lower end face of the full back wrench is pressed against the upper end face of the stopper.

In the goods fastening apparatus of the invention, a step is set at the lower inner face of the full back wrench, which fits to the stopper mouth at the outer side of the stopper. Said full back wrench has a barb set on the lower outer face. Said stopper has a bayonet set on the inner side which has a profile corresponding to said barb.

In the goods fastening apparatus of the invention, a button extending out of the hand grip is disposed at the upper end of the full back wrench, which has a sheath set thereon.

According to yet another embodiment of the present invention, in the goods fastening apparatus with improved structures described above, a bar-shaped hole is positioned at the hand grip. The upper end of the full back wrench extends out of the bar-shaped hole. The full back wrench contacts with one end of the bar-shaped hole by action of the torsion spring. In such a case, the lower end of the full back wrench locates at a position corresponding to the stopper mouth of said stopper.

In order to restrict the back-turn angle of the hand grip, in the goods fastening apparatus with improved structures described above, an arc-like edge is positioned on the side of the stopper mouth. The lower side face of the full back wrench has a profile corresponding to that of said arc-like edge. Once the lower end of the full back wrench enters the arc-like edge, the upper end of the full back wrench is released, and the lower end thereof is pressed against the arc-like edge, so that the hand grip can not keep on turning back. Therefore, the gear rack can be disengaged quickly.

In the goods fastening apparatus of the invention, a button extending out of the bar-shaped hole is disposed at the upper end of the full back wrench, which has a sheath set thereon.

The goods fastening apparatus of the invention has the following advantages over the prior art.

I Since a stopper pin is employed, the positioning claw can be easily pulled up when the hand grip is turned back. Therefore, the gear rack can be disengaged quickly after use, thereby effectively improving the working efficiency.

II A control device is employed which can lock and unlock the back-turn function of the hand grip, and the level of the back turn of the hand grip could be controlled. This way, the false operation that the positioning claw is pulled up carelessly during use is avoided. Furthermore, the apparatus is easier to operate and control.

III The stopper pin directly acts on the positioning claw and dose not influence the existing features of the goods fastening apparatus. The stopper pin is not only easy to be modified, but also dose not impair the features of the goods fastening apparatus and reduce the working life.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

First Embodiment

Figure 1:
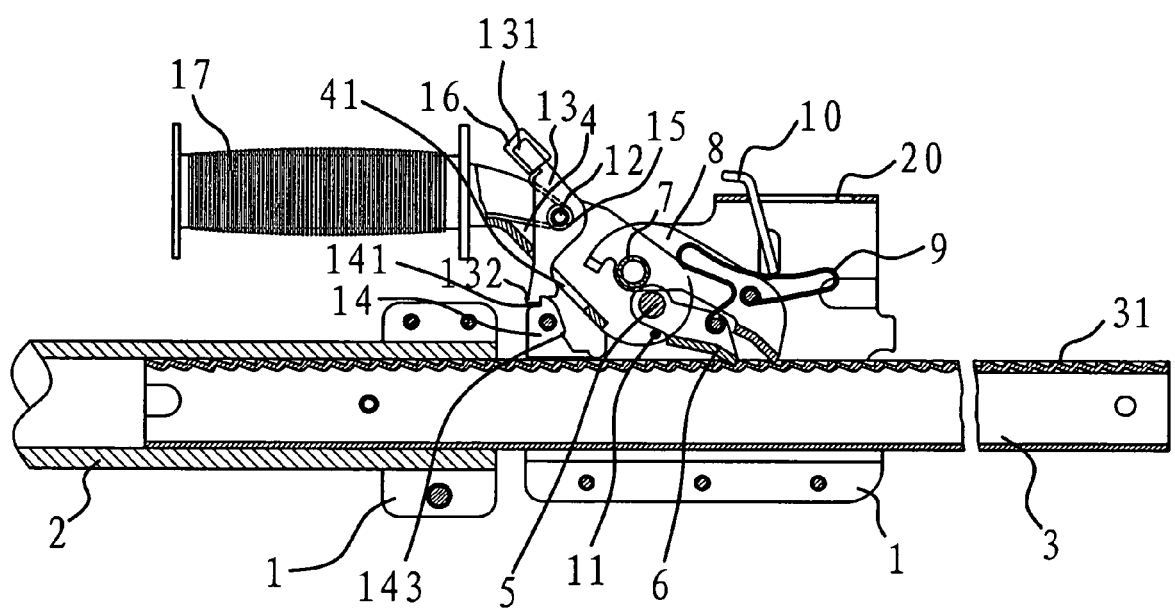
FIG. 1 is a sectional structural view of the goods fastening apparatus with improved structures according to the first embodiment of the present invention.
Figure 2:
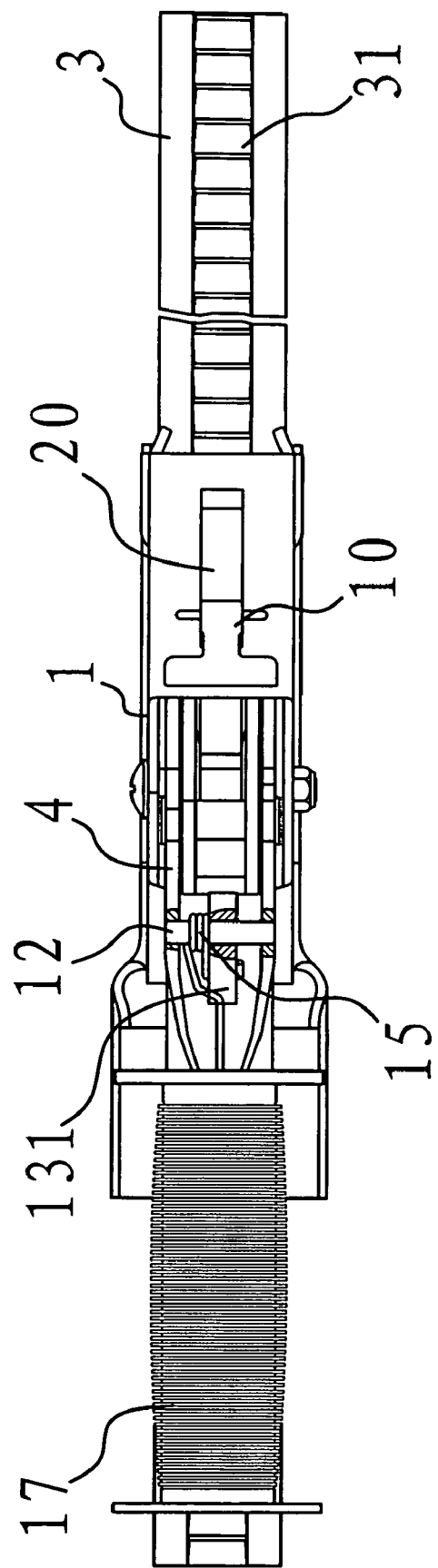
FIG. 2 is a top structural view of the goods fastening apparatus with improved structures according to the first embodiment of the present invention.
Figure 3:
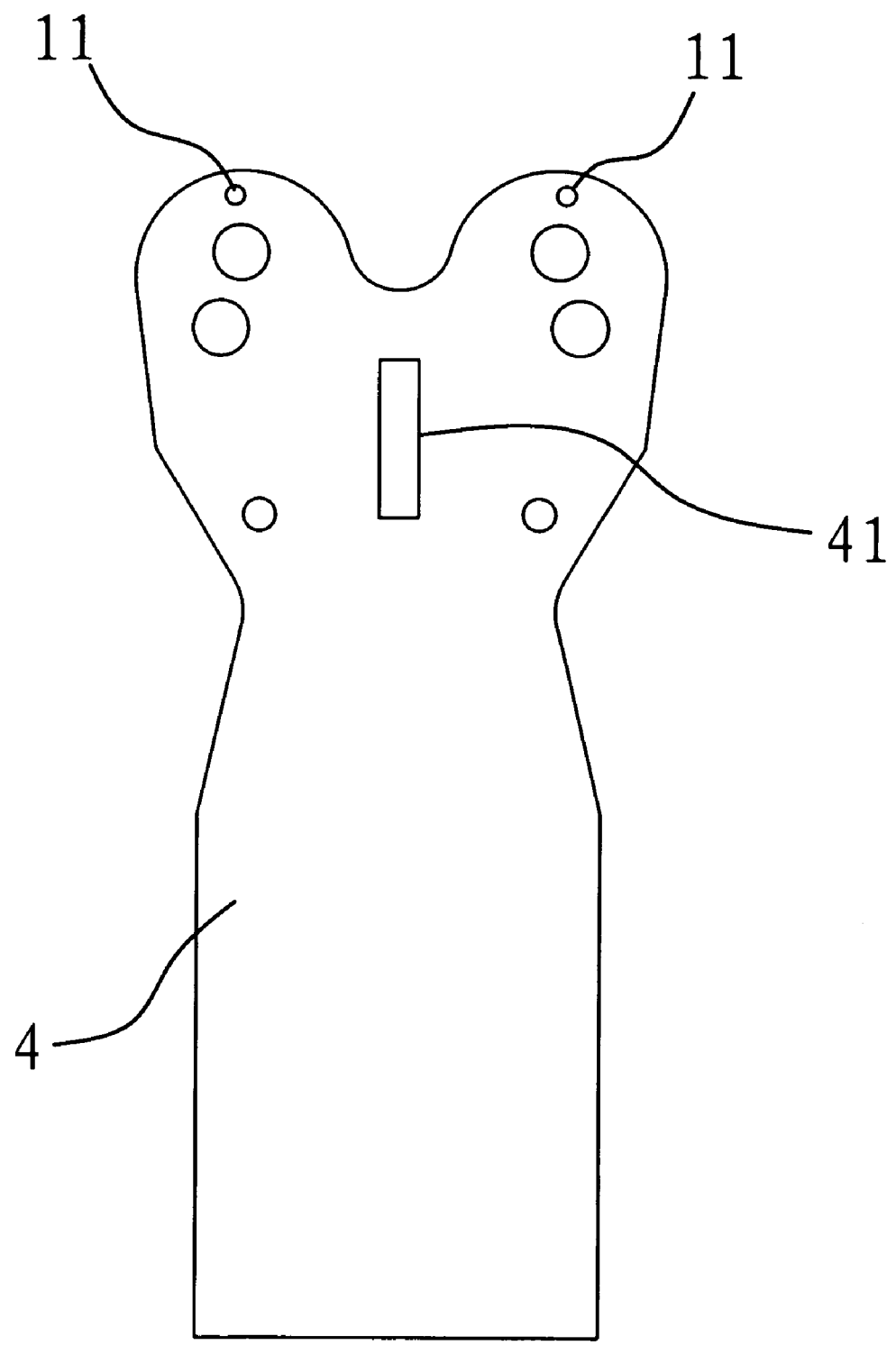
FIG. 3 is an exploded view of the hand grip of the goods fastening apparatus with improved structures according to the first embodiment of the present invention.
Figure 4:
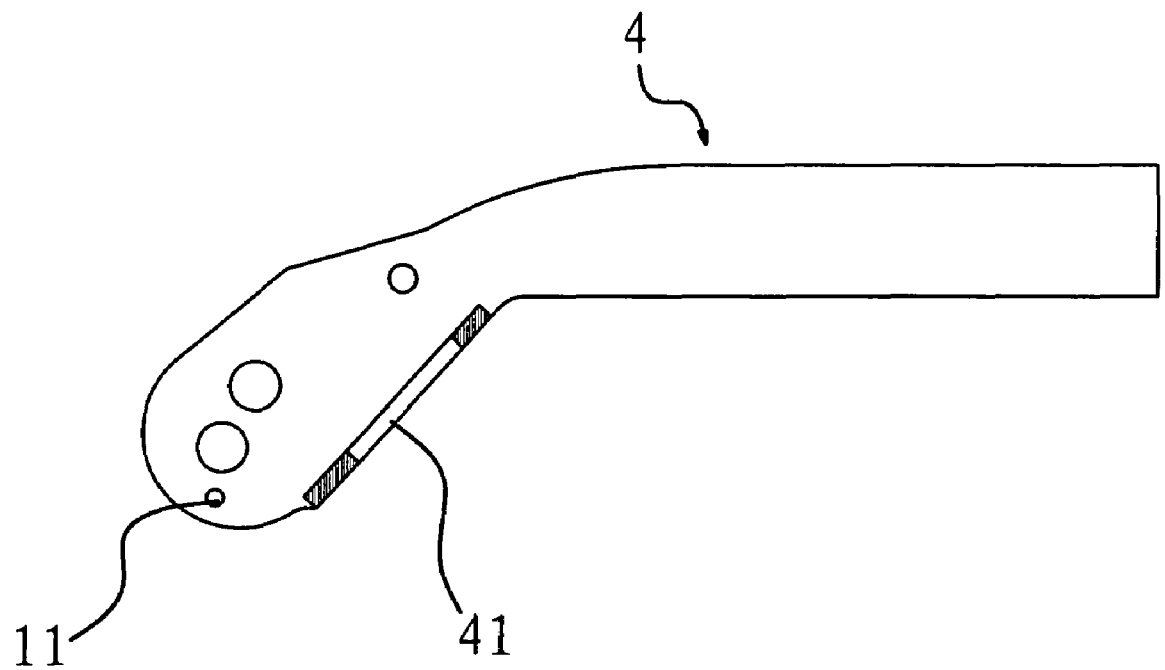
FIG. 4 is a forming view of the hand grip of the goods fastening apparatus with improved structures according to the first embodiment of the present invention.
Figure 5:
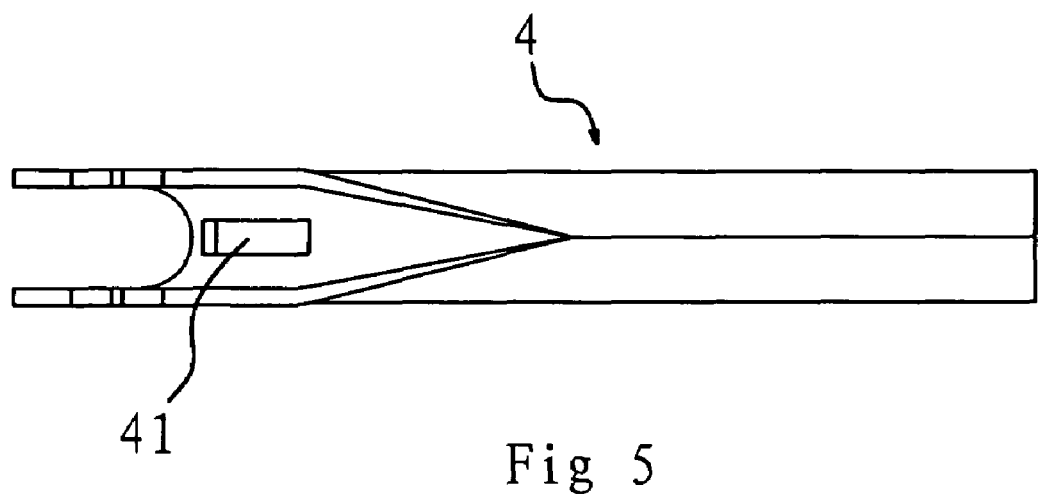
FIG. 5 is a top view of the hand grip of the goods fastening apparatus with improved structures according to the first embodiment of the present invention.

As shown in FIG. 1 and FIG. 2, a goods fastening apparatus of the invention comprises a body 1, a pipe 2, a gear rack 3, a positioning claw 6 and a driving claw 8. In this embodiment, the gear rack 3 is shaped by firstly pressing a bar plate into tooth form and then molding it by a tuber. The length of the gear rack 3 thus made can vary depending on the actual needs with much flexibility. The gear rack 3 of the present invention has obvious advantages compared to that manufactured by conventional casting methods.

The pipe 2 is fixedly connected to the body 1. The gear rack 3 passes through the body 1 and is partly muff-coupled with the inside of the pipe 2. A hand grip 4 and the positioning claw 6 are hinged to the body 1 through a primary pivot 5. A driving claw 8 is hinged to the hand grip 4 through a secondary pivot 7. A plate spring 9 is positioned between the driving claw 8 and the positioning claw 6. A grip cover 17 is covered on the hand grip 4. In order to prevent the grip cover slipping, non-slip rings are set around the grip cover 17. The grip cover 17 is usually made of plastics.

As shown in FIG. 1 and FIG. 2, both ends of the plate spring 9 are fixedly connected to the pins of the driving claw 8 and the positioning claw 6. Being mounted, the top of the plate spring 9 is pressed against a mobile stopper sheet 10 set on the body 1. The mobile stopper sheet 10 is mounted within the gear shift slot 20 of the body 1. The mobile stopper sheet 10 could slip at the top of the plate spring 9. With aid of the plate spring 9, both front ends of the driving claw 8 and the positioning claw 6 can be embedded into the gear teeth 31 of the gear rack 3.

As shown in FIG. 1, during the work of the goods fastening apparatus, the mobile stopper sheet 10 is firstly turned to the position of FIG. 1, while the stopper sheet 10 is pressed against the plate spring 9, and the plate spring 9 in turn applies the pressure to the positioning claw 6. When the hand grip 4 is turned upwards, the driving claw 8 is fixed at the gear teeth 31 of the gear rack 3, and the positioning claw 6 is moved left by one gear tooth 31 with the pressure applied by the plate spring 9 and turning of the hand grip 4. When the hand grip 4 is turned backwards, the positioning claw 6 is fixed at the gear teeth 31 of the gear rack 3, and the driving claw 8 is moved left by one gear tooth 31 with the pressure applied by the plate spring 9 and turning of the hand grip 4. In such a case, if the hand grip is turned to and fro once, the gear rack 3 will move outwards (i.e. right) one gear tooth. The gear rack 3 could be drawn out by turning the hand grip repeatedly, so that the outer ends of the gear rack 3 and pipe 2 will be pressed against both sidewalls of the goods compartment.

When demounting the goods fastening apparatus, the mobile stopper sheet 10 is firstly turned to the position opposite to that shown in FIG. 1. When the hand grip 4 is turned upwards, the positioning claw 6 is fixed at the gear teeth 31 of the gear rack 3 by action of the plate spring 9, and the driving claw 8 is moved right by one gear tooth. When the hand grip 4 is turned backwards, the driving claw 8 is fixed at the gear teeth 31 of the gear rack 3, and the positioning claw 6 is moved right by one gear tooth. In such a case, if the hand grip is turned to and fro once, the gear rack 3 will move inwards (i.e. left) one gear tooth. Therefore, the gear rack 3 will be disengaged by turning the hand grip repeatedly.

In order to disengage the gear rack quickly, a stopper pin 11 is fixed at the hand grip 4, as shown in FIGS. 1-8. The stopper pin 11 is positioned at the edge of one side of the positioning claw 6 facing the gear rack 3 while the front end of the positioning claw is embedded into the gear teeth 31 of the gear rack 3. When the hand grip 4 is turned back, the stopper pin 11 holds the positioning claw 6, so that the positioning claw 6 could be detached from the driving claw 8. Therefore, the gear rack could be disengaged quickly, and the working efficiency is effectively improved. Furthermore, the stopper pin 11 is shaped as a round pin made of steels of high strength, with the diameter thereof being 3 mm and the length thereof being 24.6 mm.

As it is difficult to control the back-turn angle, as shown in FIG. 1 and FIG. 2, a control device is set at the hand grip 4 and the body 1, to prevent the frond ends of the driving claw 8 and the positioning claw 6 detaching form the gear rack 3 by restricting the turning angle of the hand grip 4.

The control device has a full back wrench 13 hinged to the hand grip 4 through a pivot 12 and a stopper 14 fixed to the body 1. A stopper mouth 141 is set on the stopper 14. The lower end of the full back wrench 13 could sit against the stopper mouth 141. With reference to FIGS. 1-5, a bar-shaped hole 41 is positioned at the belly of the hand grip 4. The bar-shaped hole 41 could be molded by stamping after the plates used to make the hand grip 4 are clipped, and then the bar-shaped hole 41 of the hand grip 4 is partly quenched with the quenching hardness up to HRC10-20. The plates have a thickness of 3 mm, and can be folded to form the hand grip 4 after being molded by stamping. The lower end of the hand grip 4 extends out of the bar-shaped hole 41, which has a length of 28 mm and a width of 6 mm. The molded hand grip 4 could be plated with a layer of white zinc, the thickness of which is more than 0.004 mm.

Figure 6:
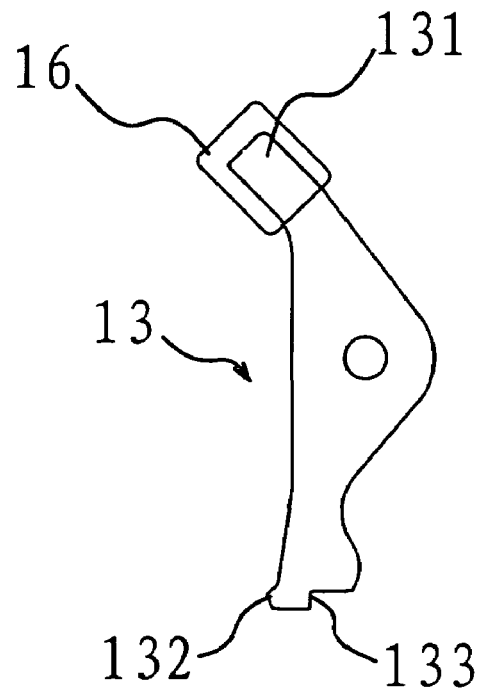
FIG. 6 is a structural diagram of the full back wrench of the goods fastening apparatus with improved structures according to the first embodiment of the present invention.
Figure 7:
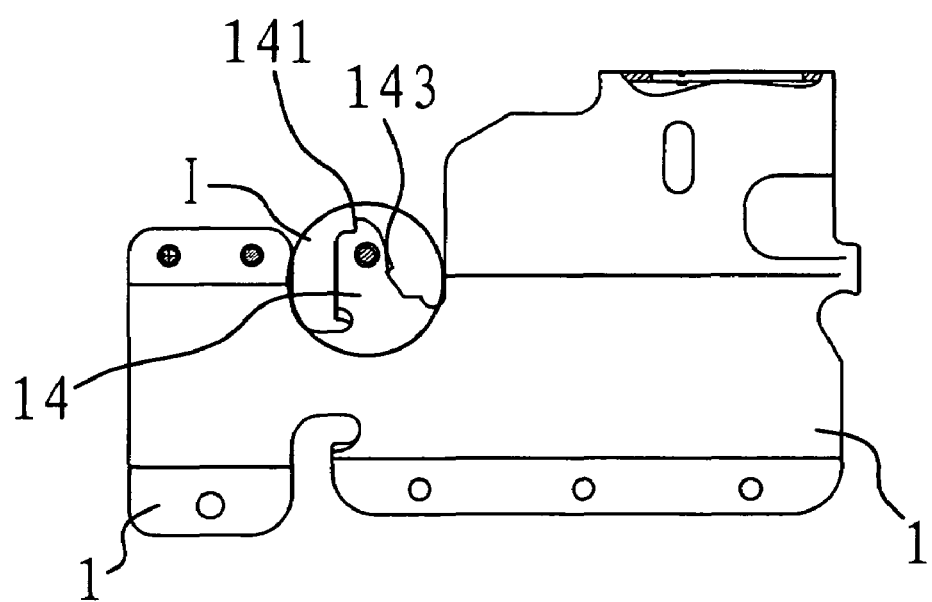
FIG. 7 is a structural diagram of the body of the goods fastening apparatus with improved structures according to the first embodiment of the present invention.
Figure 8:
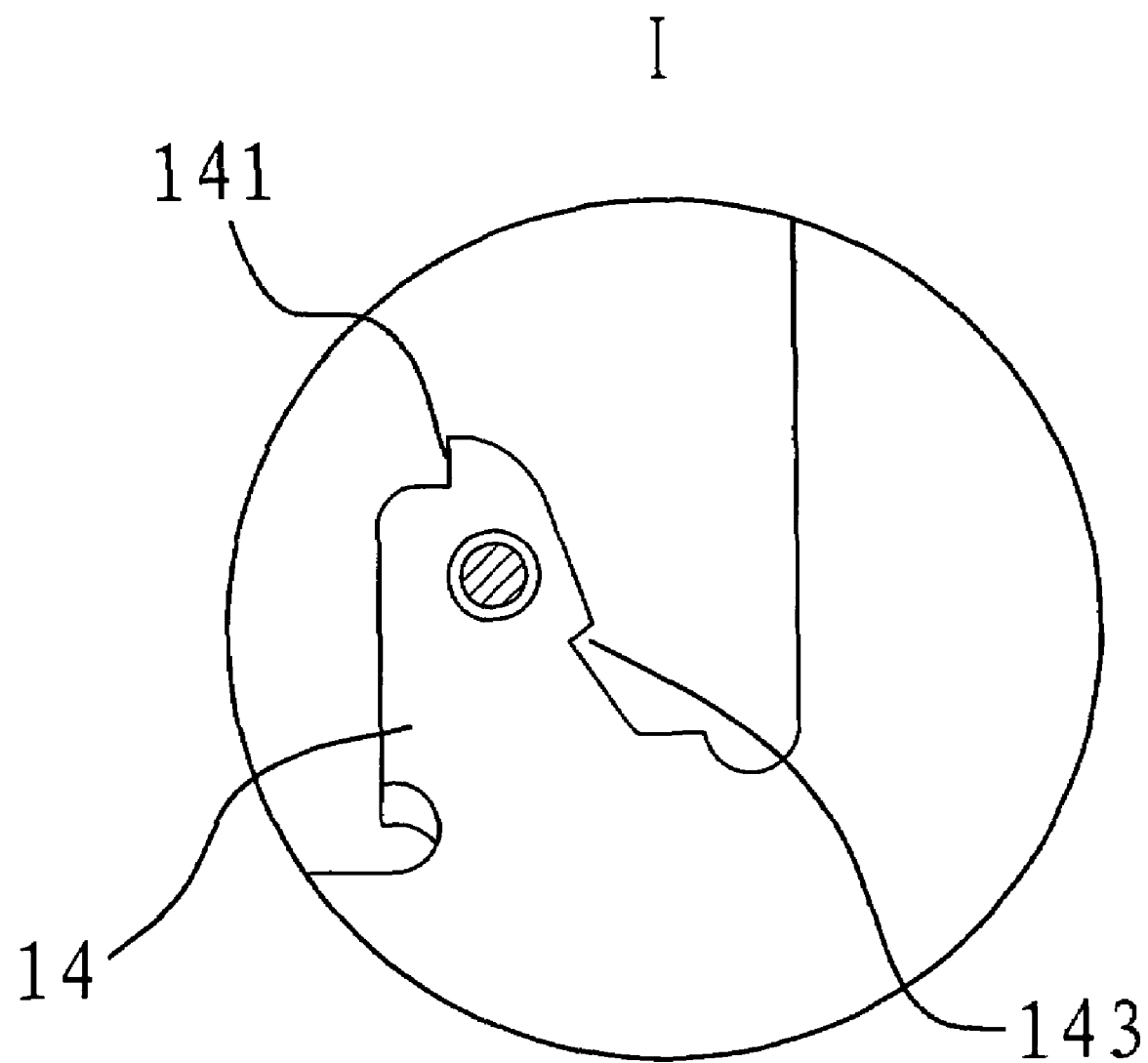
FIG. 8 is an enlarged view of the portion I as shown in FIG. 7.
Figure 9:
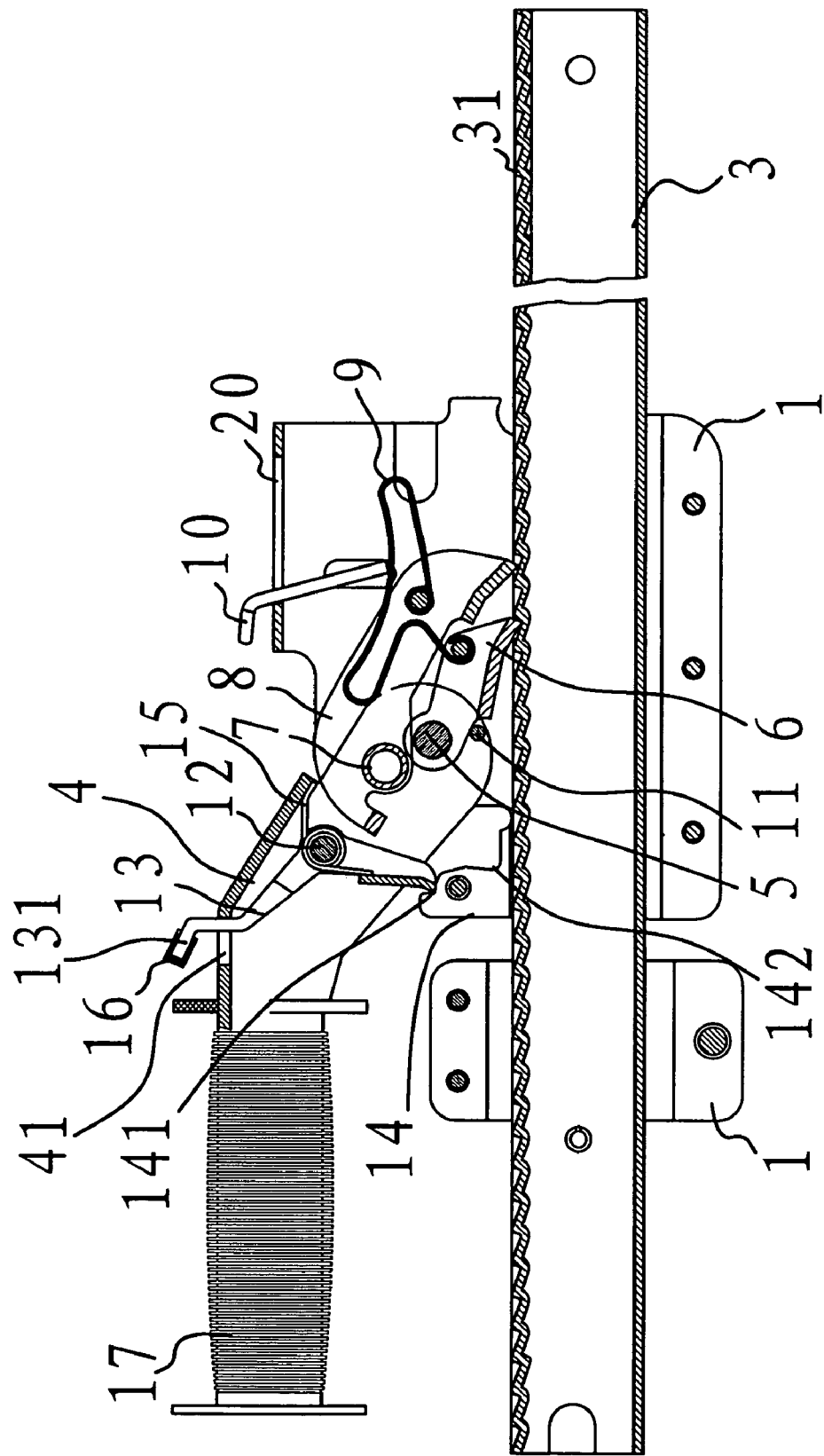
FIG. 9 is a sectional structural view of the goods fastening apparatus with improved structures according to the second embodiment of the present invention.
Figure 10:
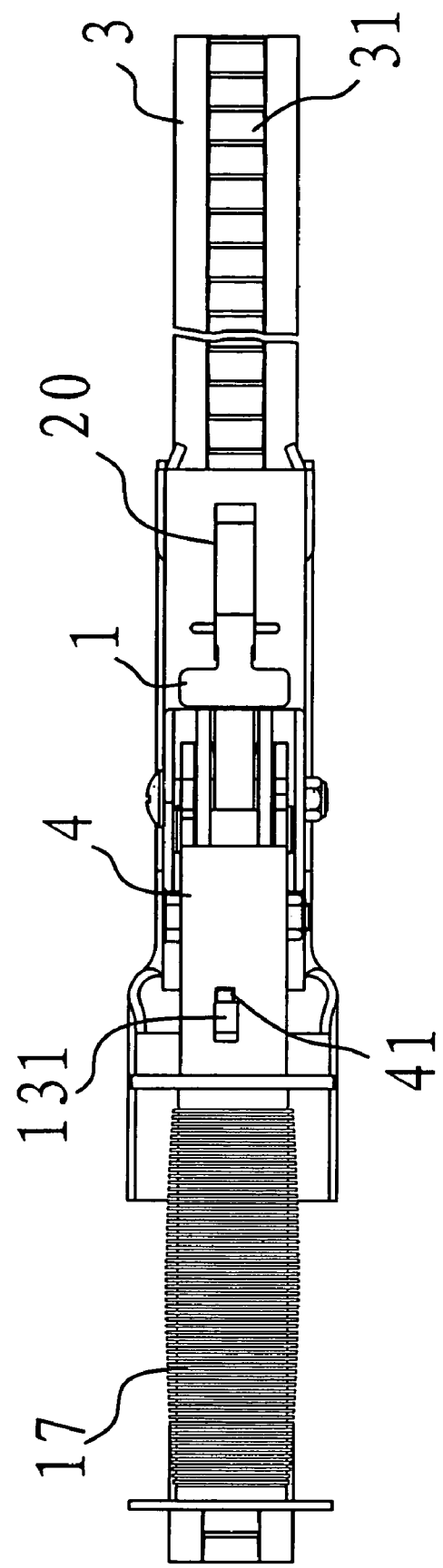
FIG. 10 is a top structural view of the goods fastening apparatus with improved structures according to the second embodiment of the present invention.
Figure 11:
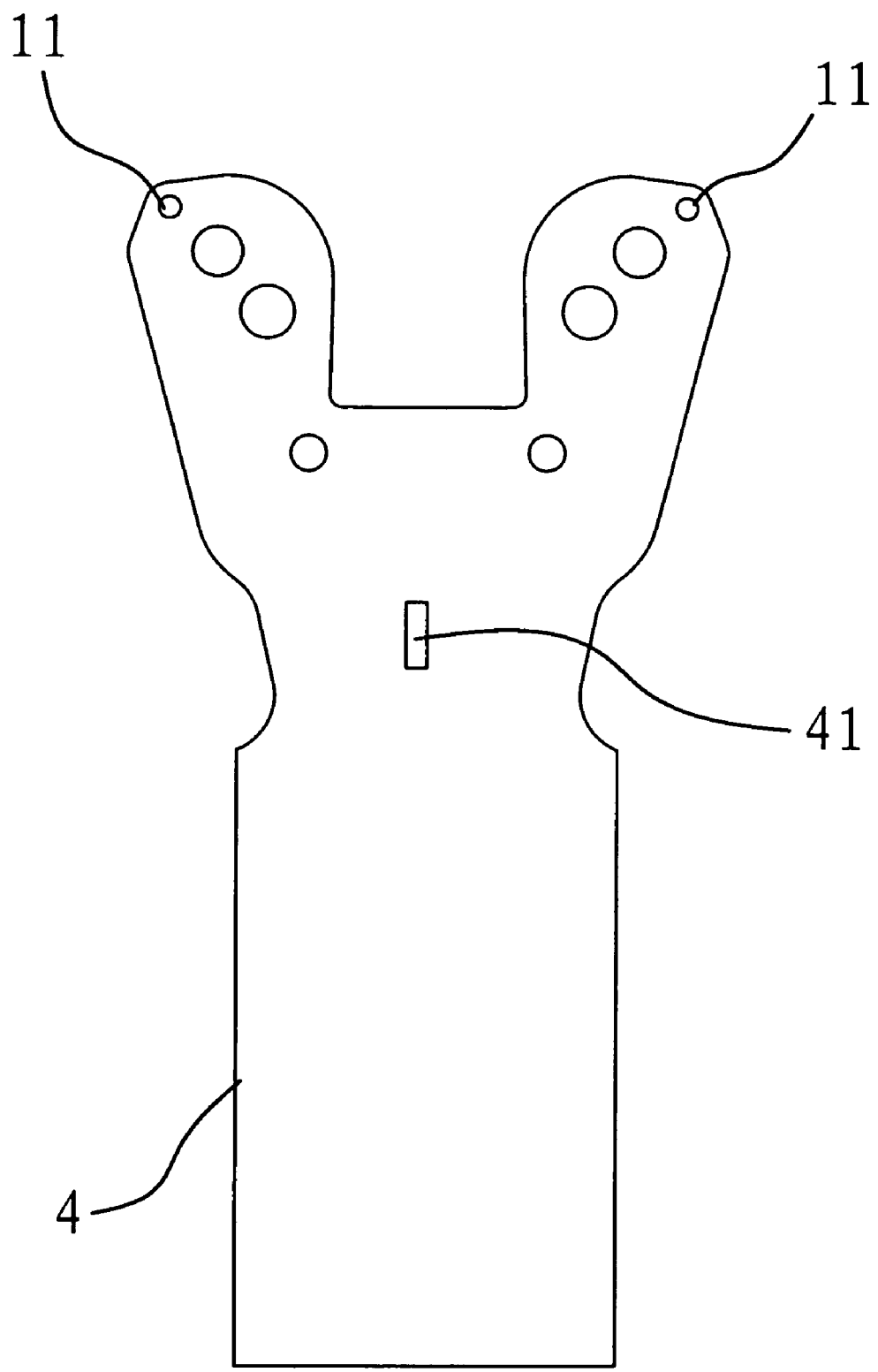
FIG. 11 is an exploded view of the hand grip of the goods fastening apparatus with improved structures according to the second embodiment of the present invention.
Figure 12:
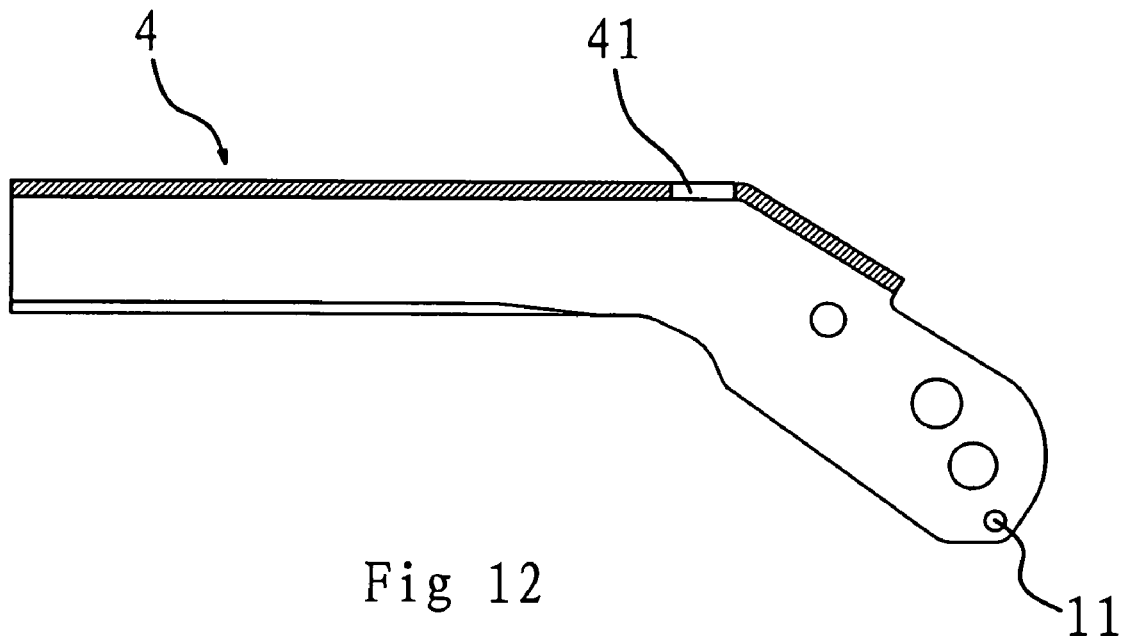
FIG. 12 is a forming view of the hand grip of the goods fastening apparatus with improved structures according to the second embodiment of the present invention.
Figure 13:
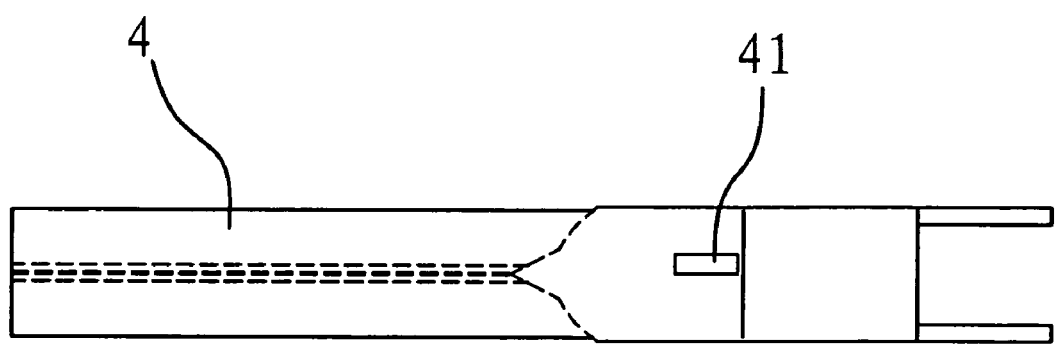
FIG. 13 is a top structural view of the hand grip of the goods fastening apparatus with improved structures according to the second embodiment of the present invention.
Figure 14:
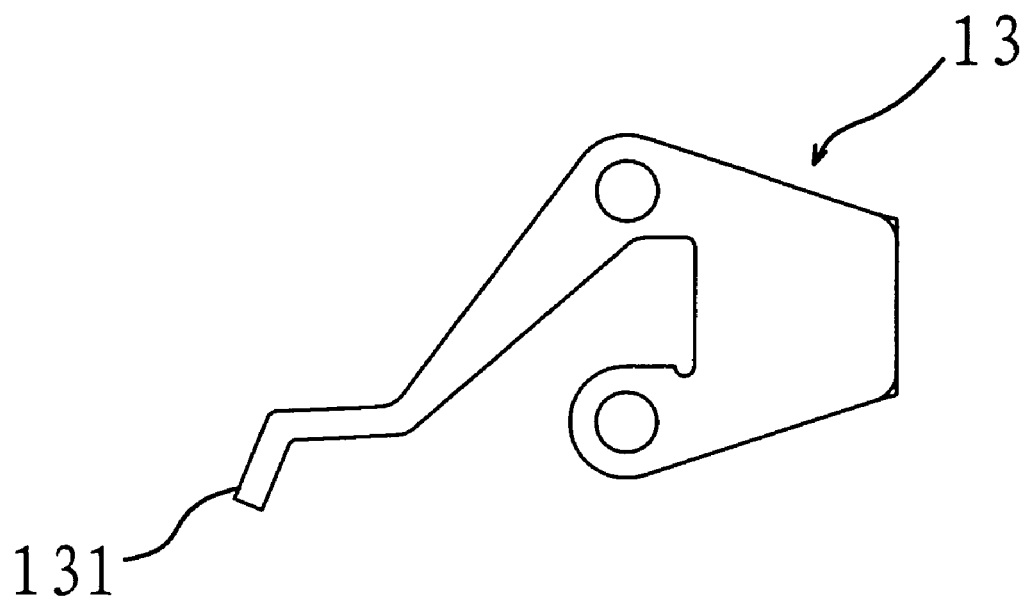
FIG. 14 is an exploded view of the full back wrench of the goods fastening apparatus with improved structures according to the second embodiment of the present invention.
Figure 15:
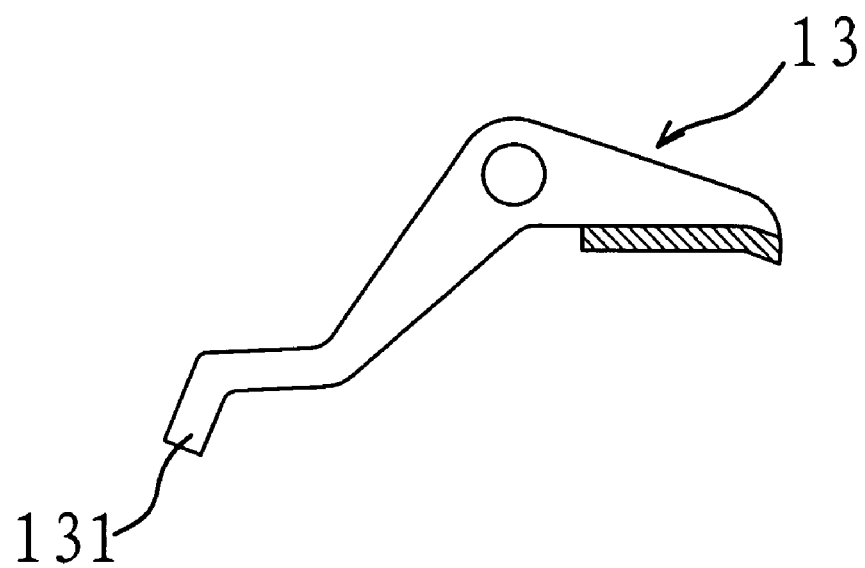
FIG. 15 is a forming view of the full back wrench of the goods fastening apparatus with improved structures according to the second embodiment of the present invention.
Figure 16:
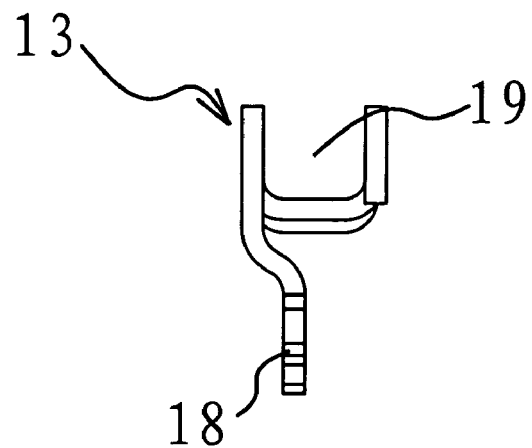
FIG. 16 is a side structural view of the full back wrench of the goods fastening apparatus with improved structures according to the second embodiment of the present invention.
Figure 17:
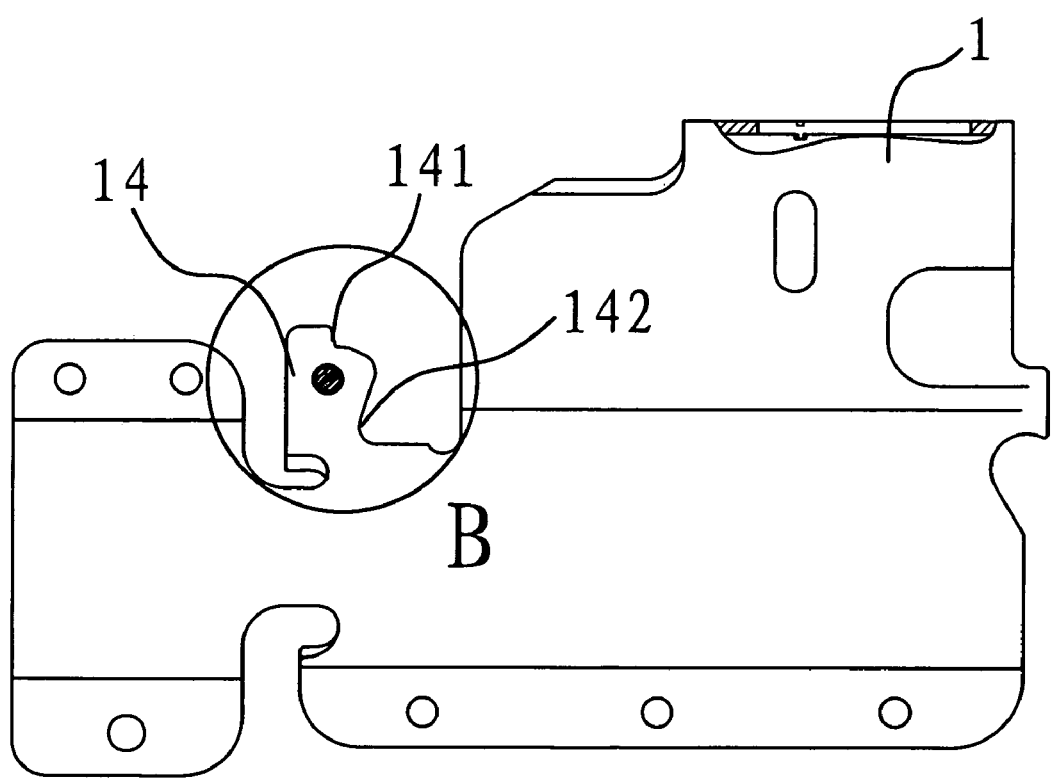
FIG. 17 is a structural diagram of the body of the goods fastening apparatus with improved structures according to the second embodiment of the present invention.
Figure 18:
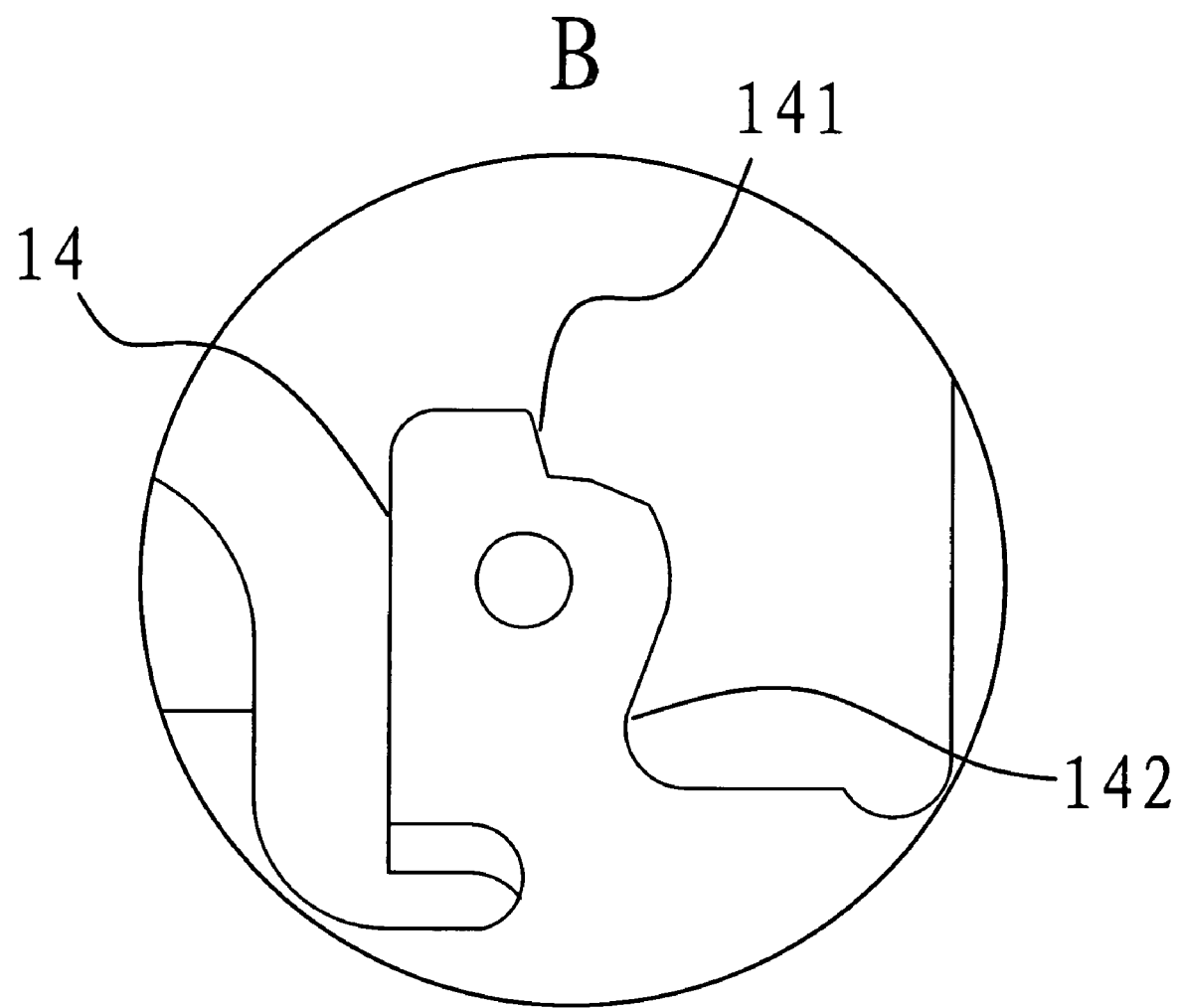
FIG. 18 is an enlarged view of the portion B as shown in FIG. 17.

As shown in FIG. 1, a torsion spring 15 is provided on the pivot 12, the two ends of which act on the hand grip 4 and full back wrench 13 respectively. The torsion spring is made of steel wires which have a diameter of 0.8 mm, with the angle between two torsion spring butts being 46 degree. The torsion spring 15 thus made is then plated with a layer of white zinc, the thickness of which is more than 0.004 mm. The full back wrench 13 contacts with one end of the bar-shaped hole 41 by action of the torsion spring 15. In such a case, the lower end of the full back wrench 13 will locate at a position corresponding to the stopper mouth 141 of said stopper 14. As shown in FIG. 6, a step 133 is set at the lower inner face of the full back wrench 13, which fits to the stopper mouth 141 at the outer side of the stopper 14. Said full back wrench 13 has a barb 132 set on the lower outer face. Said stopper 14 has a bayonet 143 set on the inner side which has a profile corresponding to said barb 132. A button 131 extending out of the hand grip 131 is disposed at the upper end of the full back wrench 13, which has a sheath 16 set thereon. The sheath 16 is usually made of materials such as plastic, so as to prevent the operator being scuffed during operation.

The step 133 at the lower end of the full back wrench 13 is seated against the stopper mouth 141 of the stopper 14 by action of the torsion spring 15. On one hand, the step 133 at the lower end of the full back wrench 13 is seated against the top of the stopper mouth 141 to prevent the hand grip keeping on turning; on the other hand, a transverse force is generated between the step 133 and the stopper mouth 141 with aid of the torsion spring 15 to prevent the full back wrench 13 turning. By this construction, it will be certain that the back turn of the hand grip 4 could be restricted, so as to prevent false operations during use.

When back turn is necessary, only the hand grip 4 need be lifted, so that the lower end of the full back wrench 13 will be detached from the stopper mouth 141, and the hand grip 4 can be turned again. If the barb 132 of the full back wrench 13 is joined with the bayonet 143 at the inner side of the stopper 14, the hand grip 4 could no longer be turned. With such a construction, the level of the back turn of the hand grip 4 could be controlled.

Second Embodiment

In this embodiment, a bar-shaped hole 41 is disposed at the back of the hand grip 4, as shown in FIGS. 9-18. The upper end of the full back wrench 13 extends out of the bar-shaped hole 41. A slot 19 for locating the end of the torsion spring 15 is provided on the full back wrench 13. Moreover, in order to facilitate mounting the sheath 16, three notches 18 are set on the button 131. The stopper 14 has a stopper mouth 141 set at the inner side thereof, on the side of which an arc-like edge 142 is positioned. The lower side face of the full back wrench 13 has a profile corresponding to that of said arc-like edge 142. The description of other parts of this embodiment is omitted for purpose of conciseness, for they are similar to those in the first embodiment.

If a force for turning the hand grip 4 back is applied in use, an acting force will be applied to the upper end of the full back wrench 13 by one end of the bar-shaped hole 41. This way, the lower end of the full back wrench 13 can not move by block of the stopper mouth 141, so that the hand grip 4 will be prevented moving back, thus avoiding dropout of the gear teeth by accidents during use.

If the gear rack needs to be disengaged quickly, the operator only has to press the button 131 on the full back wrench 13 gently. In such an instance, the upper end of the full back wrench 13 will be detached from the end of the bar-shaped hole 41, while the lower end thereof will be detached from the stopper mouth 141, so that the hand grip 4 could be turned back. Furthermore, if the hand grip 4 keeps on turning back, the lower end of the full back wrench 13 will enter the arc-like edge 142 of the stopper 14, and the upper end of the full back wrench 13 will be loosened and the lower end thereof will be pressed against the arc-like edge 142 with the torsion spring 15, so that the gear rack could be disengaged quickly.

Third Embodiment

Figure 19:
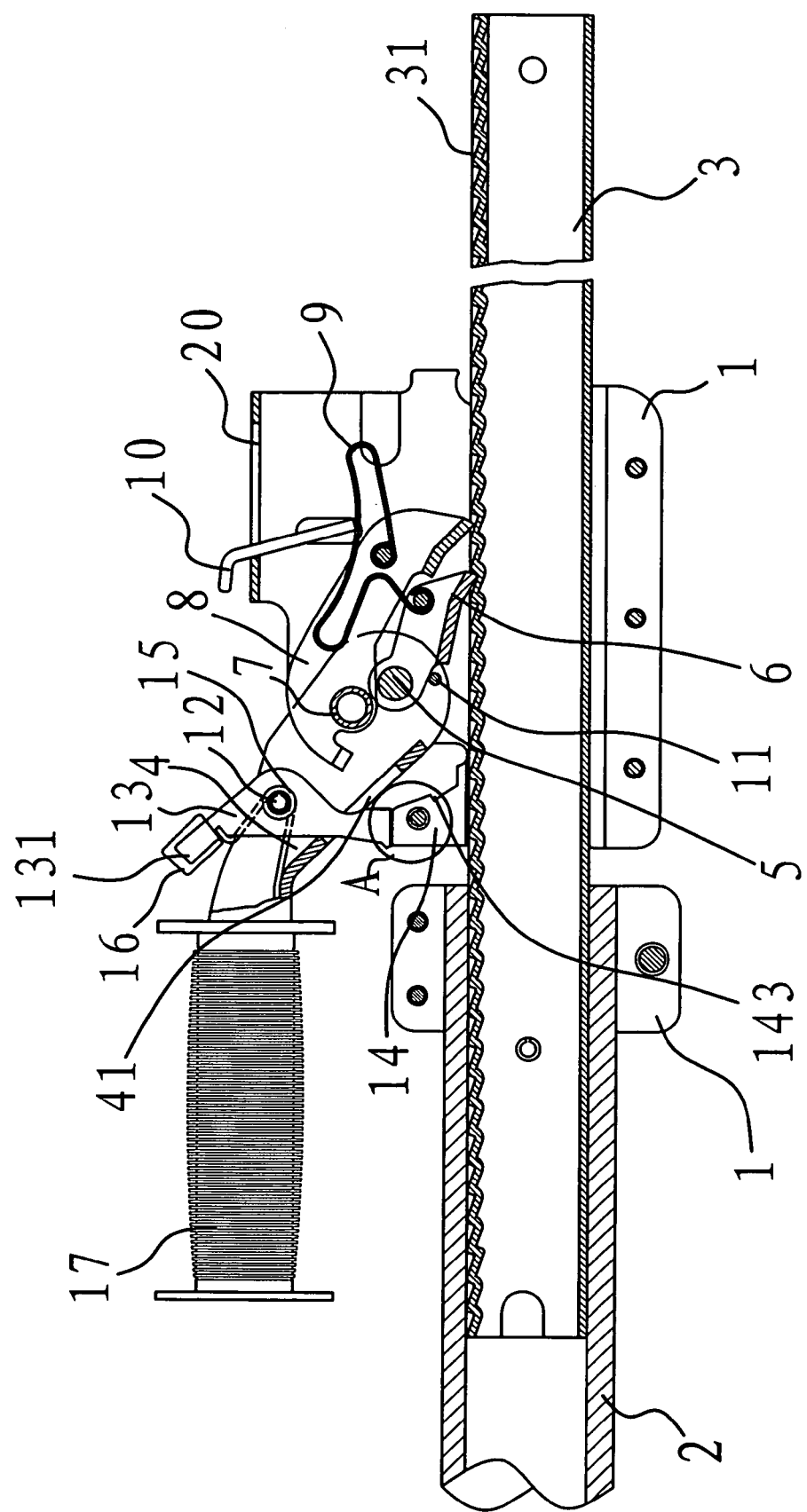
FIG. 19 is a sectional structural view of the goods fastening apparatus with improved structures according to the third embodiment of the present invention.
Figure 20:
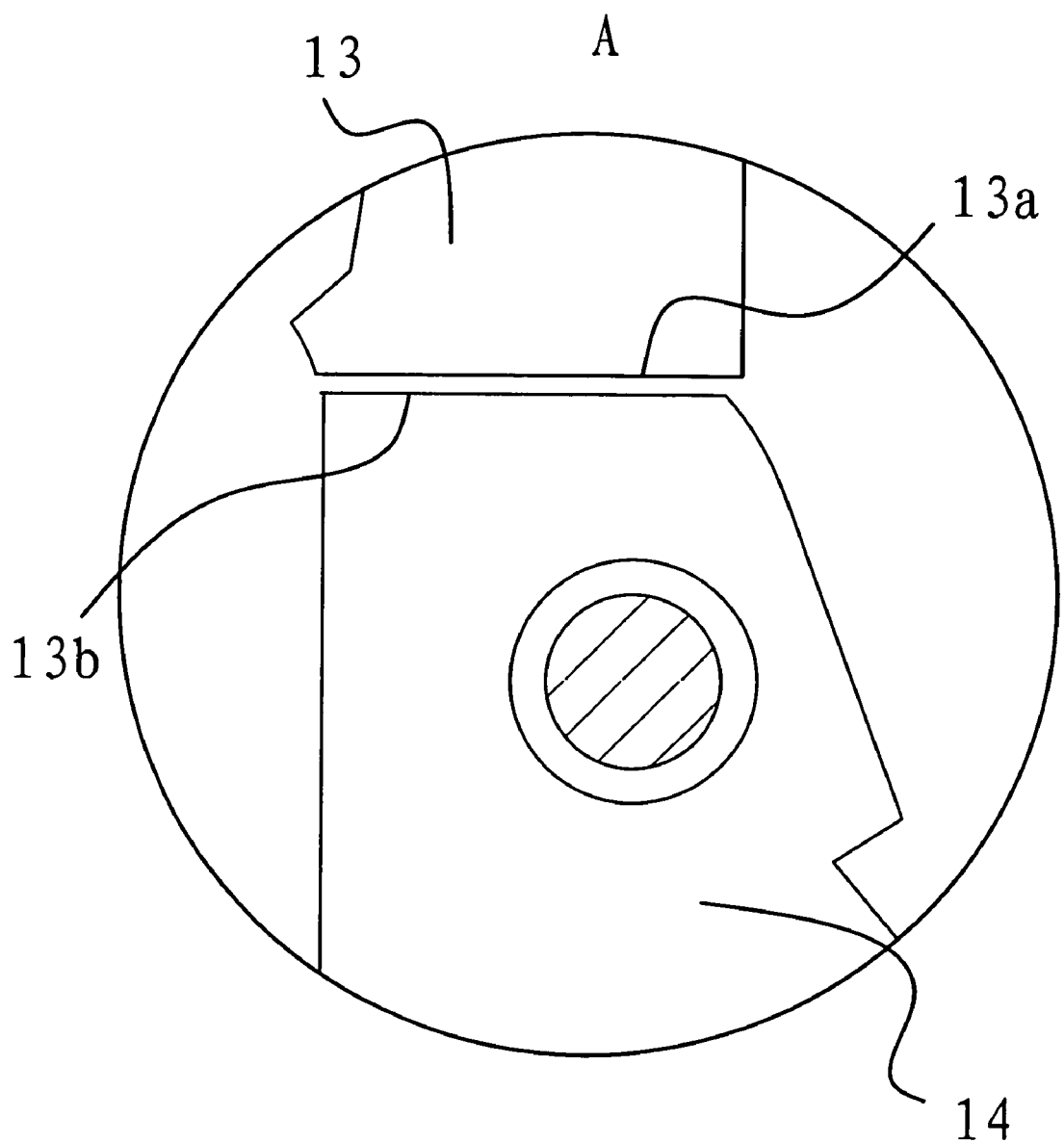
FIG. 20 is an enlarged view of the portion A as shown in FIG. 19.

In this embodiment, the control device has a full back wrench 13 hinged to the hand grip 4 through a pivot 12 and a stopper 14 fixed to the body 1, as shown in FIG. 19. The lower end face 13a of the full back wrench 13 is a flat surface, and could be pressed against the upper end face 14a of the stopper 14. The full back wrench 13 contacts with one end of the bar-shaped hole 41 with action of the torsion spring 15. In such a case, as shown in FIG. 20, the lower end face 13a of the full back wrench 13 contacts with the upper end face 14a of the stopper 14, so that the hand grip could not keep on turning. The description of other parts of this embodiment is omitted for purpose of conciseness, for they are similar to those in the first embodiment.

Although a lot of terms such as body 1, pipe 2, gear rack 3, gear tooth 31, hand grip 4, bar-shaped hole 41, primary pivot 5, positioning claw 6, secondary pivot 7, driving claw 8, plate spring 9, mobile stopper sheet 10, stopper pin 11, pivot 12, full back wrench 13, lower end face 13a, button 131, barb 132, step 133, stopper 14, upper end face 14a, stopper mouth 141, arc-like edge 142, bayonet 143, torsion spring 15, sheath 16, grip cover 17, notch 18, slot 19 and gearshift slot 20 are used herein, it is not excluded that other terms could be used. These terms are merely used to illustrate and explain the essence of the invention without any limitation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

LIST OF REFERENCE NUMERALS

1 body
2 pipe
3 gear rack
31 gear tooth
4 hand grip
41 bar-shaped hole
5 primary pivot
6 positioning claw
7 secondary pivot
8 driving claw
9 plate spring
10 mobile stopper sheet
11 stopper pin
12 pivot
13 full back wrench
13a lower end face
131 button
132 barb
133 step
14 stopper
14a upper end face
141 stopper mouth
142 arc-like edge
143 bayonet
15 torsion spring
16 sheath
17 grip cover
18 notch
19 slot
20 gearshift slot

What is claimed is:

1. A goods fastening apparatus with improved structures, comprising:

a body (1), a pipe (2) fixedly connected to the body (1) and a gear rack (3) passing through the body (1) and partly muff-coupled with the inside of the pipe (2), wherein a hand grip (4) and a positioning claw (6) are hinged to the body (1) through a primary pivot (5), a driving claw (8) is hinged to the hand grip (4) through a secondary pivot (7), a plate spring (9) is positioned between the driving claw (8) and the positioning claw (6), a mobile stopper sheet (10) pressed against the plate spring (9) is provided at the upper portion of the body (1), the front ends of the driving claw (8) and the positioning claw (9) can be embedded into the gear teeth (31) of the gear rack (3) with aid of the plate spring (9), characterized in that, a stopper pin (11) is fixed at the hand grip (4), which is positioned at the edge of one side of the positioning claw (6) facing the gear rack (3) while the front end of the positioning claw (6) is embedded into the gear teeth (31) of the gear rack (3), and wherein a control device is set at the hand grip (4) and the body (1) to prevent the front ends of the driving claw (9) and the positioning claw (6) from detaching from the gear rack (3) by restricting the turning angle of the hand grip (4), said control device comprising a full back wrench (13) hinged to the hand grip (4) through a pivot (12) and a stopper (14) fixed to the body (1).

2. The goods fastening apparatus as claimed in claim 1, characterized in that, a stopper mouth (141) is set at said stopper (14), and the lower end of the full back wrench (13) is seated against the stopper mouth (141).

3. The goods fastening apparatus as claimed in claim 1, characterized in that, the lower end face (13*a*) of the full back wrench (13) is seated against the upper end face (14*a*) of the stopper (14).

4. The goods fastening apparatus as claimed in claim 1, characterized in that, a torsion spring (15) is provided on the pivot (12), the two ends of which act on the hand grip (4) and full back wrench (13) respectively.

5. The goods fastening apparatus as claimed in claim 4, characterized in that, a bar-shaped hole (41) is positioned at said hand grip (4), the lower end of the full back wrench (13) extends out of the bar-shaped hole (41), the full back wrench (13) contacts with one end of the bar-shaped hole (41) by action of the torsion spring (15), in such a case, the lower end of the full back wrench (13) is pressed against a position corresponding to the stopper mouth (141) of said stopper (14).

6. The goods fastening apparatus as claimed in claim 5, characterized in that, a step (133) is set at the lower inner face of the full back wrench (13), which fits to the stopper mouth (141) at the outer side of the stopper (14); said full back wrench (13) has a barb (132) set on the lower outer face, and said stopper (14) has a bayonet (143) set on the inner side thereof which has a profile corresponding to said barb (132).

7. The goods fastening apparatus as claimed in claim 6, characterized in that, a button (131) extending out of the hand grip (4) is disposed at the upper end of the full back wrench (13), which has a sheath (16) set thereon.

8. The goods fastening apparatus as claimed in claim 5, characterized in that, a button (131) extending out of the hand grip (4) is disposed at the upper end of the full back wrench (13), which has a sheath (16) set thereon.

9. The goods fastening apparatus as claimed in claim 4, characterized in that, a bar-shaped hole (41) is positioned at the hand grip (4), the upper end of the full back wrench (13) extends out of the bar-shaped hole (41), the full back wrench (13) contacts with one end of the bar-shaped hole (41) by action of the torsion spring (15), in such a case, the lower end of the full back wrench (13) locates at a position corresponding to the stopper mouth (141) of said stopper (14).

10. The goods fastening apparatus as claimed in claim 9, characterized in that, an arc-shaped edge (142) is positioned on the side of the stopper mouth (141), and the lower side face of the full back wrench (13) has a profile corresponding to that of said arc-shaped edge (142).

11. The goods fastening apparatus as claimed in claim 9, characterized in that, a button (131) extending out of the bar-shaped hole (41) is disposed at the upper end of the full back wrench (13), which has a sheath (16) set thereon.

* * * * *